(12) United States Patent
Yoon et al.

(10) Patent No.: US 12,472,855 B2
(45) Date of Patent: Nov. 18, 2025

(54) FOLDABLE SEAT APPARATUS FOR MULTI-PURPOSE VEHICLE

(71) Applicants: Hyundai Motor Company, Seoul (KR); Kia Corporation, Seoul (KR); DAS CO., LTD, Gyeongsangbuk-do (KR)

(72) Inventors: Sang Hwi Yoon, Incheon (KR); Hyun Ko, Gyeonggi-do (KR); Hyo Cheol Kang, Gyeonggi-do (KR); Sang Do Park, Gyeonggi-do (KR); Du Go Jung, Gyeonggi-do (KR); Yong Jae Sung, Ulsan (KR); Jin Ho Choi, Gyeongsangbuk-do (KR)

(73) Assignees: Hyundai Motor Company, Seoul (KR); Kia Corporation, Seoul (KR); DAS CO., LTD, Gyeongsangbuk-do (KR)

( * ) Notice: Subject to any disclaimer, the term of this patent is extended or adjusted under 35 U.S.C. 154(b) by 557 days.

(21) Appl. No.: 17/990,672

(22) Filed: Nov. 19, 2022

(65) Prior Publication Data

US 2023/0294577 A1    Sep. 21, 2023

(30) Foreign Application Priority Data

Mar. 15, 2022    (KR) .......................... 10-2022-0031809

(51) Int. Cl.
*B60N 2/34* (2006.01)
*B60N 2/20* (2006.01)
(Continued)

(52) U.S. Cl.
CPC ................. *B60N 2/34* (2013.01); *B60N 2/20* (2013.01); *B60N 2/80* (2018.02); *B60N 2/882* (2018.02)

(58) Field of Classification Search
CPC . B60N 2/20; B60N 2/206; B60N 2/34; B60N 2/806; B60N 2/832; B60N 2/882
(Continued)

(56) References Cited

U.S. PATENT DOCUMENTS 4,065,174 A * 12/1977 Yokohama ............... B60N 2/32
297/66
5,713,634 A *  2/1998 Koike ...................... B60N 2/68
297/216.12

FOREIGN PATENT DOCUMENTS

DE    202017005615 U1 *  3/2018  ............... B60N 2/34
JP         H07-9149 U       2/1995
(Continued)

*Primary Examiner* — Jason S Daniels
(74) *Attorney, Agent, or Firm* — Fox Rothschild LLP

(57) ABSTRACT

A foldable seat apparatus for a multi-purpose vehicle is provided. The apparatus includes a seat unit composed of a seat cushion, and a seatback rotatably coupled to the seat cushion, and configured to rotate the seatback and formed to make a horizontal state with the seat cushion according to an operation of an operation lever, a headrest unit mounted on the seatback, and provided to be separable, a mounting guide unit fixed and coupled to the seat cushion; and a pillow mounting unit positioned to be latched to the mounting guide unit to be stored in the seat cushion, drawn out to the outside of the seat cushion by selectively being latch-released from the mounting guide unit in the horizontal state, and equipped with the headrest unit to guide the headrest unit to be switched to a set pillow mode.

19 Claims, 17 Drawing Sheets

(51) Int. Cl.
*B60N 2/80* (2018.01)
*B60N 2/882* (2018.01)

(58) Field of Classification Search
USPC .................................... 296/65.09, 65.16, 69
See application file for complete search history.

(56) References Cited

FOREIGN PATENT DOCUMENTS

| | | |
|---|---|---|
| JP | 3297418 B2 | 7/2002 |
| JP | 2007-210391 A | 8/2007 |
| KR | 20-1998-0017732 U | 7/1998 |
| KR | 20-0126200 Y | 7/1998 |

* cited by examiner

FOLDABLE SEAT APPARATUS FOR MULTI-PURPOSE VEHICLE

CROSS-REFERENCE TO RELATED APPLICATION

This application claims under 35 U.S.C. § 119(a) the benefit of Korean Patent Application No. 10-2022-0031809 filed on Mar. 15, 2022, the entire contents of which are incorporated herein by reference.

BACKGROUND

Technical Field

The present disclosure relates to a foldable seat apparatus for a multi-purpose vehicle, and more specifically, to a foldable seat apparatus for a multi-purpose vehicle, which may make a seat fully flat through folding upon car camping (camping in which a user lodges inside a vehicle) using the multi-purpose vehicle, and remove a headrest configuring the seat to use the removed headrest as a pillow.

Background

In general, a rear seat of a van is configured to be foldable for space utilization according to the number of passengers, the amount of luggage, or the like.

In general, the rear seat is configured to have an adjustable angle of a backrest so that the occupants may maintain a comfortable posture when seated, and the backrest is configured in a structure that is completely folded to come into contact with the seat for passage inside the vehicle, loading of luggage, or the like.

Meanwhile, recently, due to the popularity of the camping and the car camping (camping in which a user lodges inside the vehicle), there are many cases in which the user rests or lodges inside the vehicle, and in most of general rear seat folding structures, the backrest is not fully reclined.

Even when the structure in which the backrest is fully reclined is applied, there is a disadvantage in that it is not easy for the user to lie down and rest comfortably or sleep because a space between the seat and the backrest exists or a stepped portion occurs therebetween, and accordingly, there occurs inconvenience such as having to flatten the folded seat again using a separate wood, plate, or the like on the folded seat after folding the seat.

In addition, since the headrest configuring the seat inevitably interferes with the facing seats in other rows even when the structure in which the backrest is fully reclined is applied, the headrest should be removed to solve the problem, but after removal, not only there is a risk of loss, but also a separate storage space is required even when a storage is made to prevent loss, which causes inconvenience in which a lodging space inside the vehicle is narrow.

SUMMARY OF THE DISCLOSURE

An object of the present disclosure is to provide a foldable seat apparatus for a multi-purpose vehicle, which may make a seat fully flat through folding upon camping or car camping (camping in which a user lodges inside a vehicle) using a multi-purpose vehicle (MPV), and prevent a risk of loss through mounting by removing a headrest that interferes with the facing seats in other rows, and allow the headrest to be used as a separate pillow, thereby improving convenience of residing in the vehicle.

A foldable seat apparatus for a multi-purpose vehicle according to the present disclosure includes a seat unit composed of a seat cushion, and a seatback rotatably coupled to the seat cushion, and configured to rotate the seatback and formed to make a horizontal state with the seat cushion according to an operation of an operation lever, a headrest unit mounted on the seatback, and provided to be separable, a mounting guide unit fixed and coupled to the seat cushion, and a pillow mounting unit positioned to be latched to the mounting guide unit to be stored in the seat cushion, drawn out to the outside of the seat cushion by selectively being latch-released from the mounting guide unit in the horizontal state, and equipped with the headrest unit to guide the headrest unit to be switched to a set pillow mode.

In the horizontal state, the seat unit may be fully flat with respect to the seat cushion.

Preferably, the pillow mode is a mode in which the headrest unit is mounted on the pillow mounting unit, and selectively mounted as the seat unit makes the horizontal state so that an occupant's head is supported by the seat cushion.

Here, the pillow mounting unit includes a main body portion movably coupled to a pair of connecting portions provided in the mounting guide unit stored in the seat cushion, a slide lever portion rail-coupled to the main body portion, and formed to slide inside the main body portion, a locking portion positioned to be latched to a latching groove provided in the mounting guide unit, and formed to be selectively rotated as the slide lever portion slides and is pressurized and latch-released from the latching groove, and a mounting portion provided to be exposed to the outside as the main body portion moves to be drawn out from the seat cushion, and configured to guide the coupling of the headrest unit for a switch to the pillow mode.

In addition, the main body portion is adjustable in position in forward and backward directions of the headrest unit by adjusting a drawn-out position when drawn out from the inside of the seat cushion.

The main body portion includes a base member including a pair of coupling areas for coupling the mounting portion, a cover member including a through hole coupled to the base member, and formed to face any one of the pair of coupling areas, and an operation member exposed to the outside in a state of being disposed to come into contact with one side of the slide lever portion, and configured to rotate axially according to a pulling operation to selectively pressurize the slide lever portion, and latch-release the locking portion.

In addition, the main body portion further includes a push button that is inserted into the through hole, and pressurizes a release button provided on the mounting portion to be formed so that a height of the headrest unit is adjustable and removable.

In some embodiments, the push button may face the release button.

Meanwhile, the headrest unit includes a head portion composed of a first area supporting an occupant's head in a state of being mounted on the seatback and a second area positioned above the first area, and a coupling portion provided on a lower portion of the head portion facing the second area, and mounted on the seatback or the pillow mounting unit and formed so that the head portion is fixed thereto.

In some embodiments, the coupling portion comprises an adjustment groove. The coupling portion may comprise a plurality of adjustment grooves, and a height of the head portion may be adjusted by an interval between the adjustment grooves.

The pillow mounting unit may further comprise a guide lock that latch-releases the adjustment groove.

Here, the head portion is formed so that the first area supports the occupant's head when the head portion is mounted on the seatback, and the second area supports the occupant's head in the pillow mode when the head portion is mounted on the pillow mounting unit.

In addition, the mounting guide unit includes a coupling plate including a pair of latching grooves having edges coupled and fixed to a center pipe and a main pipe configuring the seat cushion, and formed to be spaced apart from each other in a drawn-out direction of the pillow mounting unit, and a plurality of compression springs coupled to the coupling plate, and configured to selectively provide an elastic force toward the pillow mounting unit that is drawn out.

The compression springs may be coupled to a mounting groove provided on the coupling plate. The compression springs may be configured to elastically pressurize a push fin protruding from the main body portion.

The mounting guide unit further includes a stopper provided on the coupling plate, and formed to limit a drawn-out position of the pillow mounting unit in the drawn-out direction, and the stopper is positioned inside each of a pair of slot holes provided in the pillow mounting unit.

In addition, the pillow mode is set so that the pillow mounting unit is positioned to be latched to the latching groove positioned at a front side among the pair of latching grooves and the stopper is positioned to be latched to one end of the slot hole.

According to the present disclosure, it is possible to make the seat fully flat through folding upon camping or car camping (camping in which the user lodges inside the vehicle) using the multi-purpose vehicle (MPV), and prevent a risk of loss through mounting by removing the headrest that interferes with the facing seats in other rows.

In addition, according to the present disclosure, it is possible to improve convenience of residing in the vehicle by coupling the removed headrest to the pillow mounting unit selectively drawn out from the seat cushion to enable the headrest to be used as the pillow.

In another embodiment, vehicles are provided that comprise an apparatus as disclosed herein.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein.

Figure 1A:
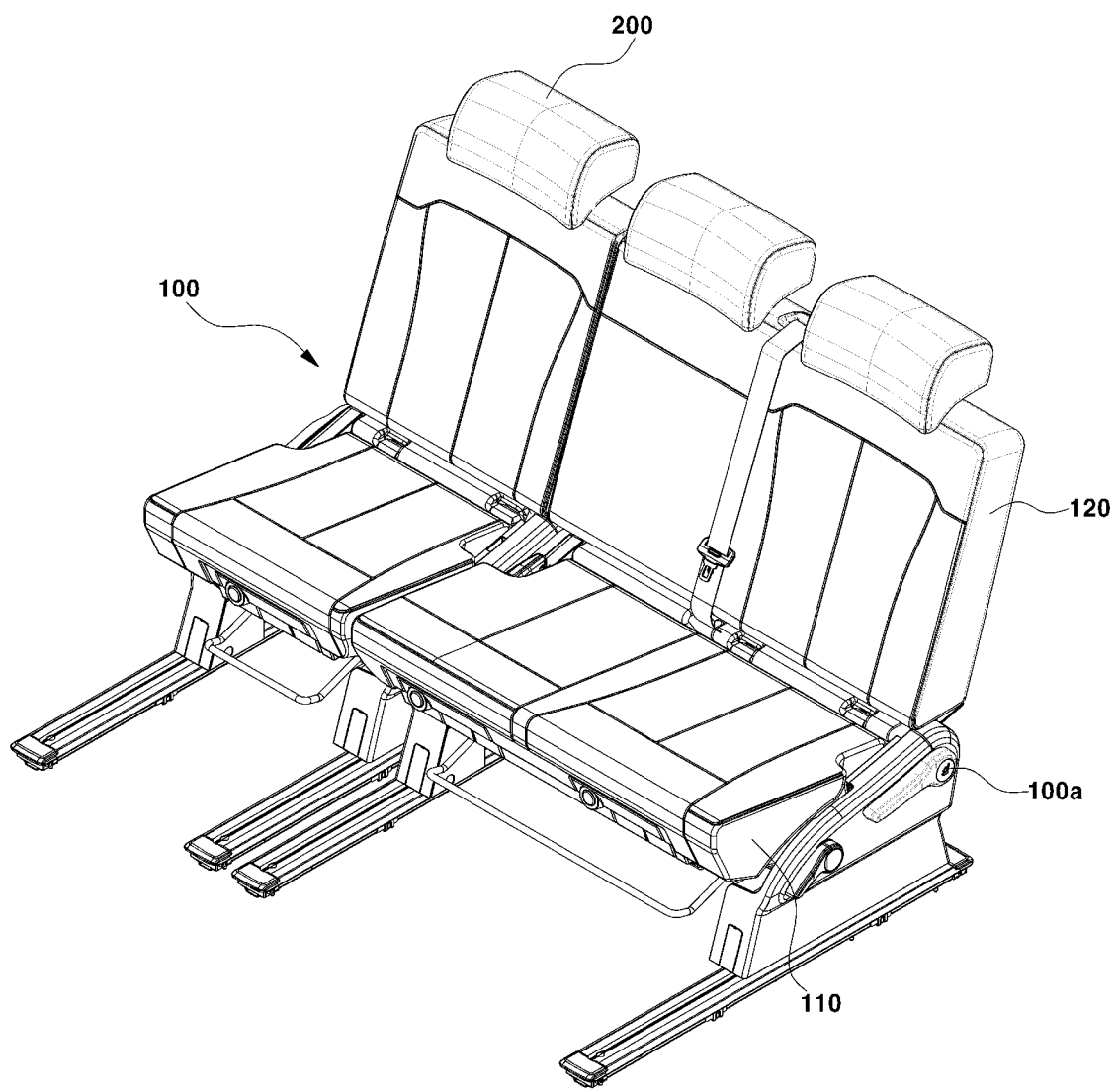
FIGS. 1A to 1C are views showing a normal mode, a full flat mode, and a pillow mode of a foldable seat apparatus for a multi-purpose vehicle according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, preferred embodiments of the present disclosure will be described in detail with reference to the accompanying drawings.

Advantages and features of the present disclosure and methods of achieving them will be made clear from embodiments described in detail below with reference to the accompanying drawings.

However, the present disclosure is not limited to embodiments disclosed below but will be implemented in various different forms, and only these embodiments are provided so that the disclosure of the present disclosure will be thorough and complete and will fully convey the scope of the present disclosure to those skilled in the art to which the present disclosure pertains, and the present disclosure is defined by the description of the claims.

In addition, in describing the present disclosure, the detailed description of a related known configuration or function will be omitted when it obscures the gist of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

Figure 1B:
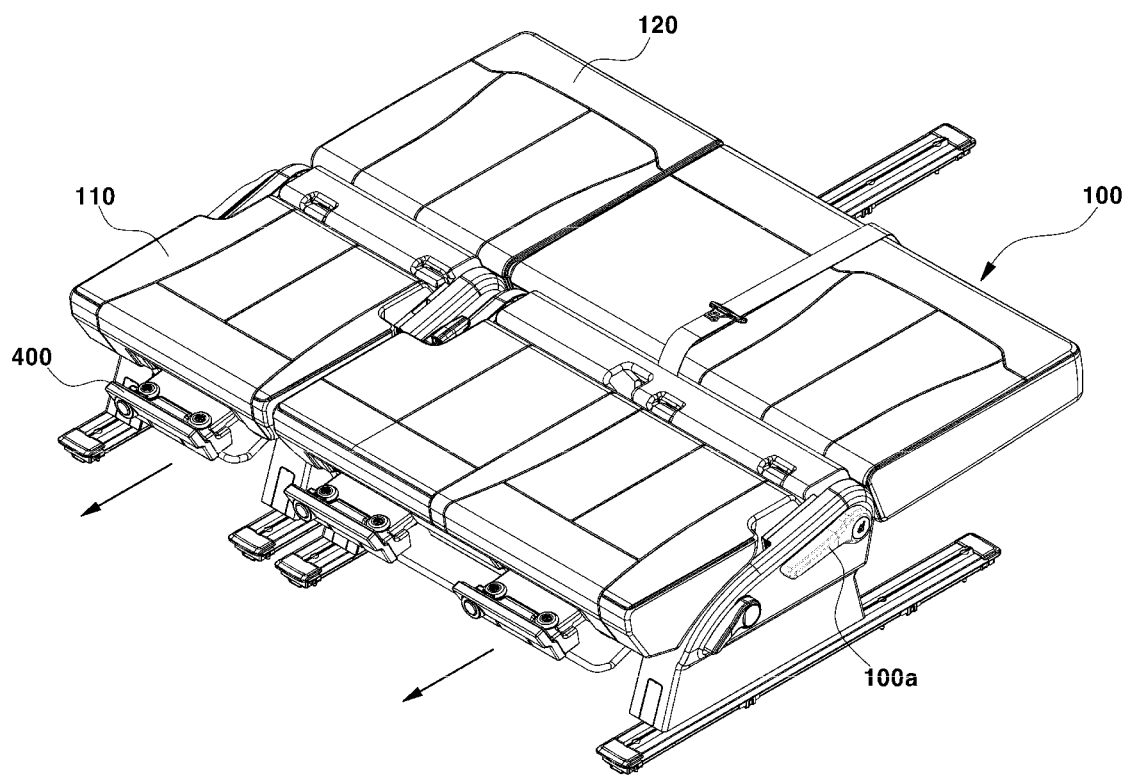
Figure 1C:
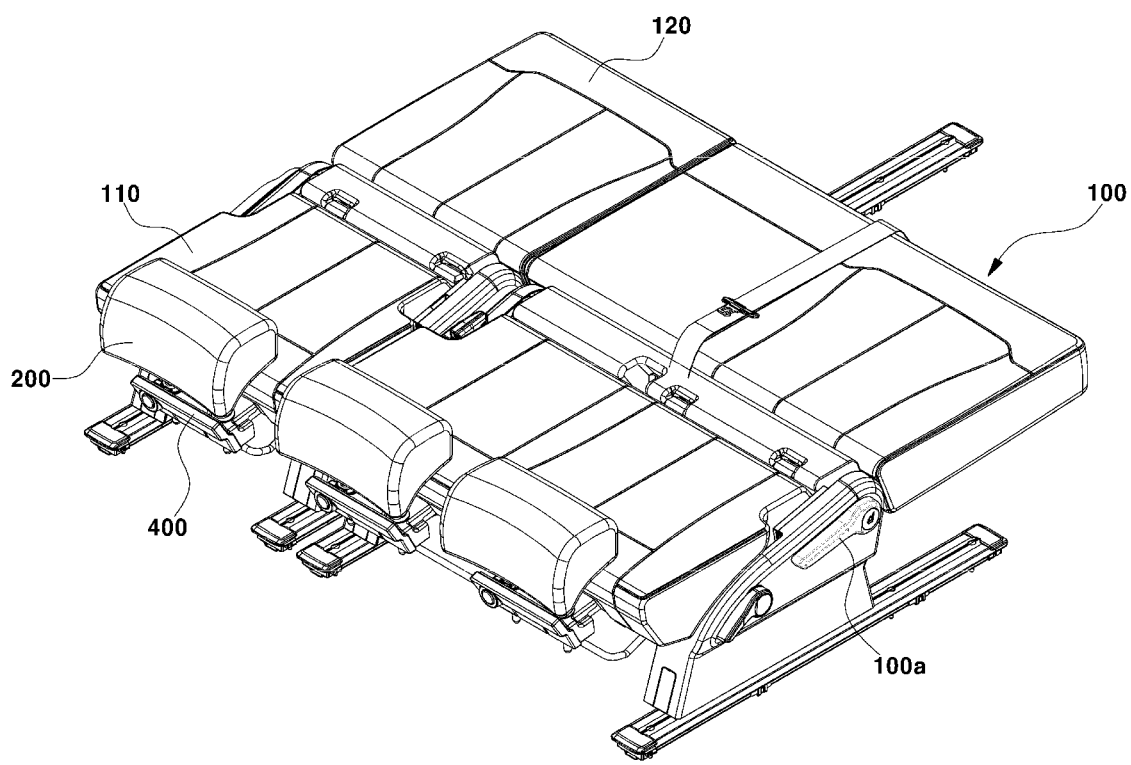
Figure 2:
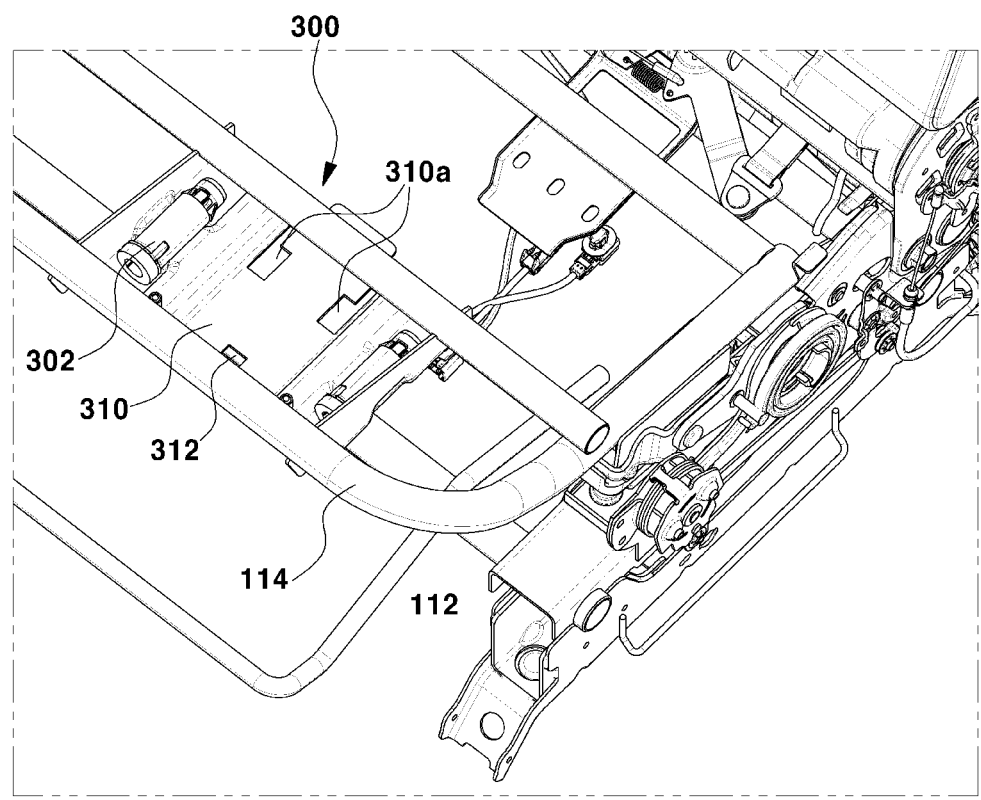
FIG. 2 is a view showing a mounting guide unit of the foldable seat apparatus for the multi-purpose vehicle according to an embodiment of the present disclosure.
Figure 3:
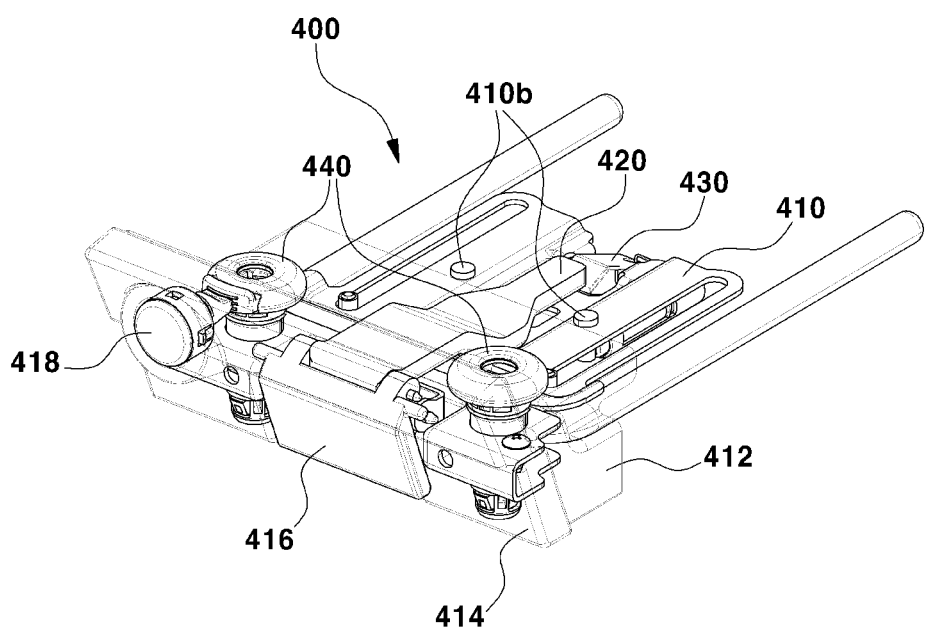
FIG. 3 is a view showing a coupled state of a pillow mounting unit of the foldable seat apparatus for the multi-purpose vehicle according to an embodiment of the present disclosure.

FIGS. 1A to 1C are views showing a normal mode, a full flat mode, and a pillow mode of a foldable seat apparatus for a multi-purpose vehicle according to an embodiment of the present disclosure, FIG. 2 is a view showing a mounting guide unit of the foldable seat apparatus for the multi-purpose vehicle according to an embodiment of the present disclosure, and FIG. 3 is a view showing a coupled state of a pillow mounting unit of the foldable seat apparatus for the multi-purpose vehicle according to an embodiment of the present disclosure.

Figure 4:
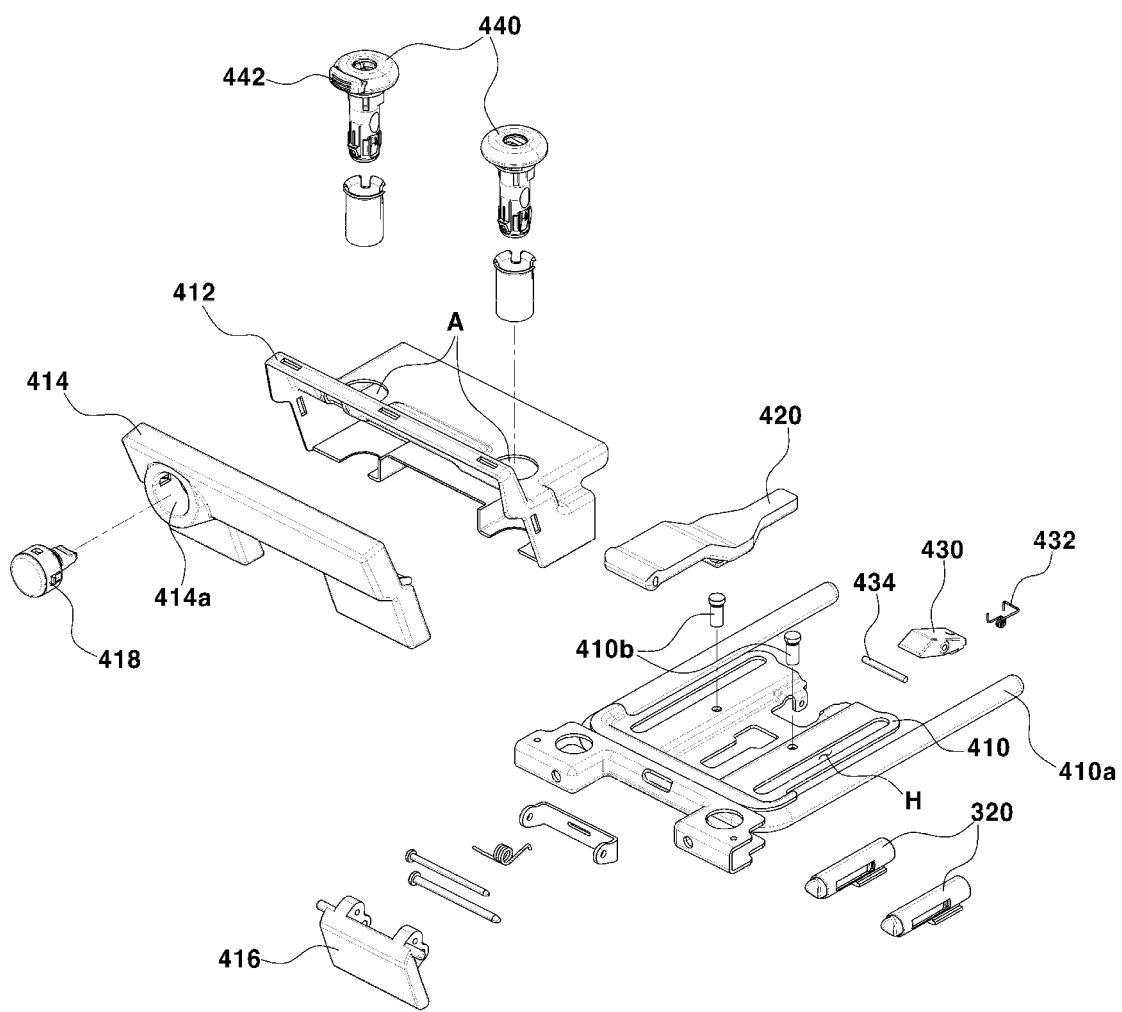
FIG. 4 is a view showing a separated state of the pillow mounting unit the foldable seat apparatus for the multi-purpose vehicle according to an embodiment of the present disclosure.
Figure 5:
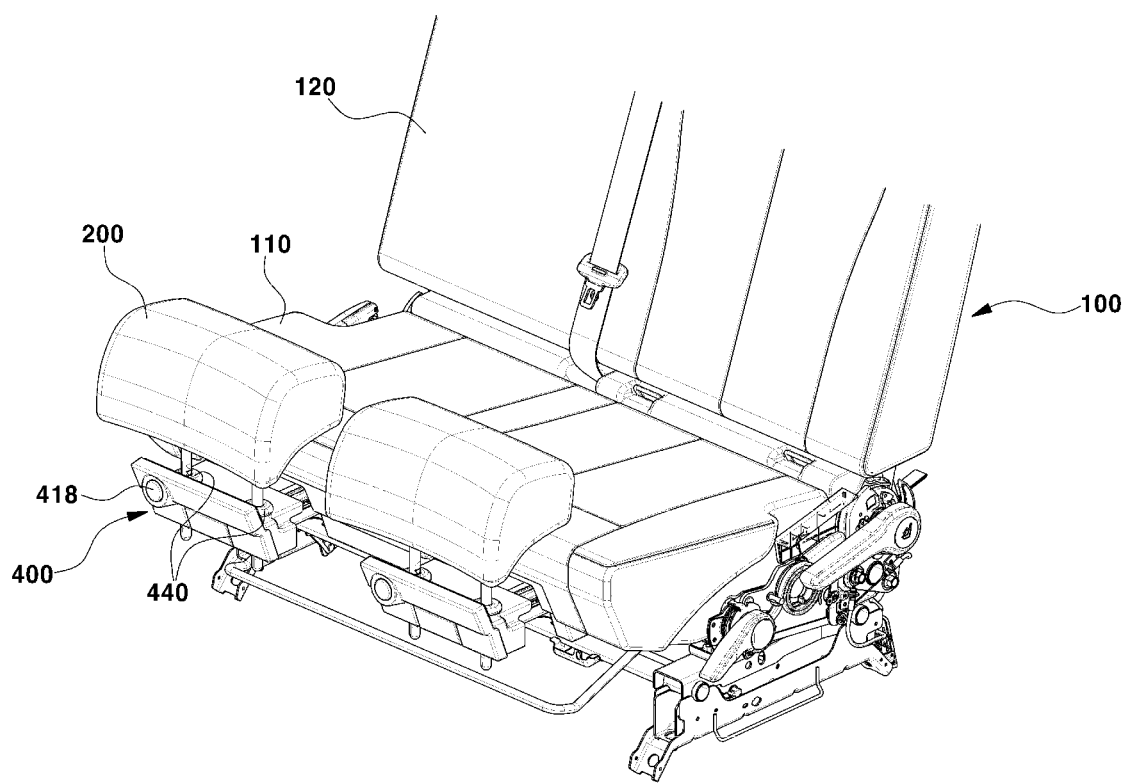
FIG. 5 is a view showing the coupling of a headrest unit of the pillow mode of the foldable seat apparatus for the multi-purpose vehicle according to an embodiment of the present disclosure.
Figure 6:
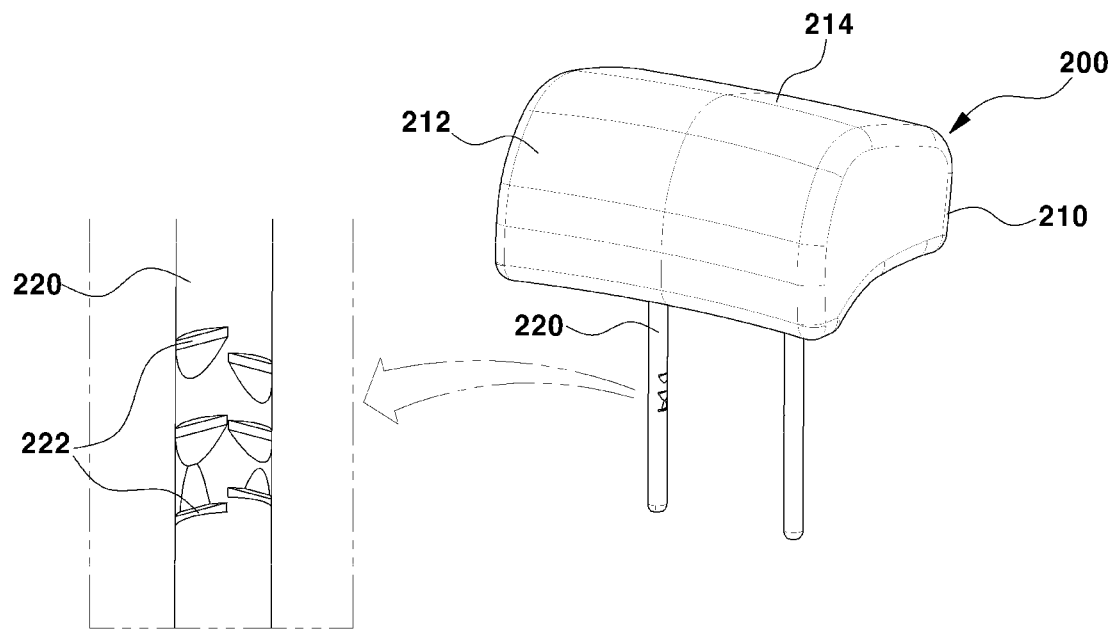
FIG. 6 is a view showing the headrest unit of the foldable seat apparatus for the multi-purpose vehicle according to an embodiment of the present disclosure.

In addition, FIG. 4 is a view showing a separated state of the pillow mounting unit of the foldable seat apparatus for the multi-purpose vehicle according to an embodiment of the present disclosure, FIG. 5 is a view showing the coupling of a headrest unit of the pillow mode of the foldable seat apparatus for the multi-purpose vehicle according to an embodiment of the present disclosure, and FIG. 6 is a view showing the headrest unit of the foldable seat apparatus for the multi-purpose vehicle according to an embodiment of the present disclosure.

Figure 7:
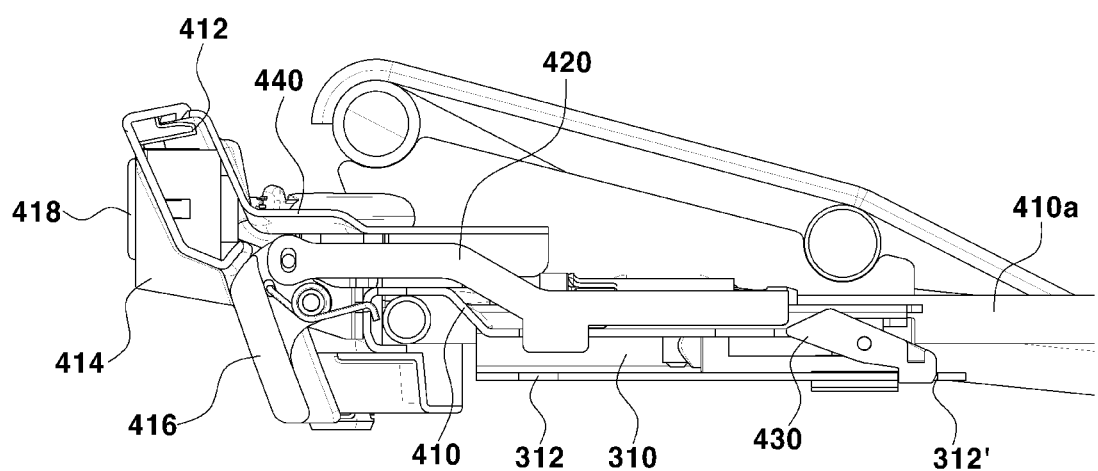
FIGS. 7 and 8 are views showing a stored state of the pillow mounting unit of the foldable seat apparatus for the multi-purpose vehicle according to an embodiment of the present disclosure.
Figure 8:
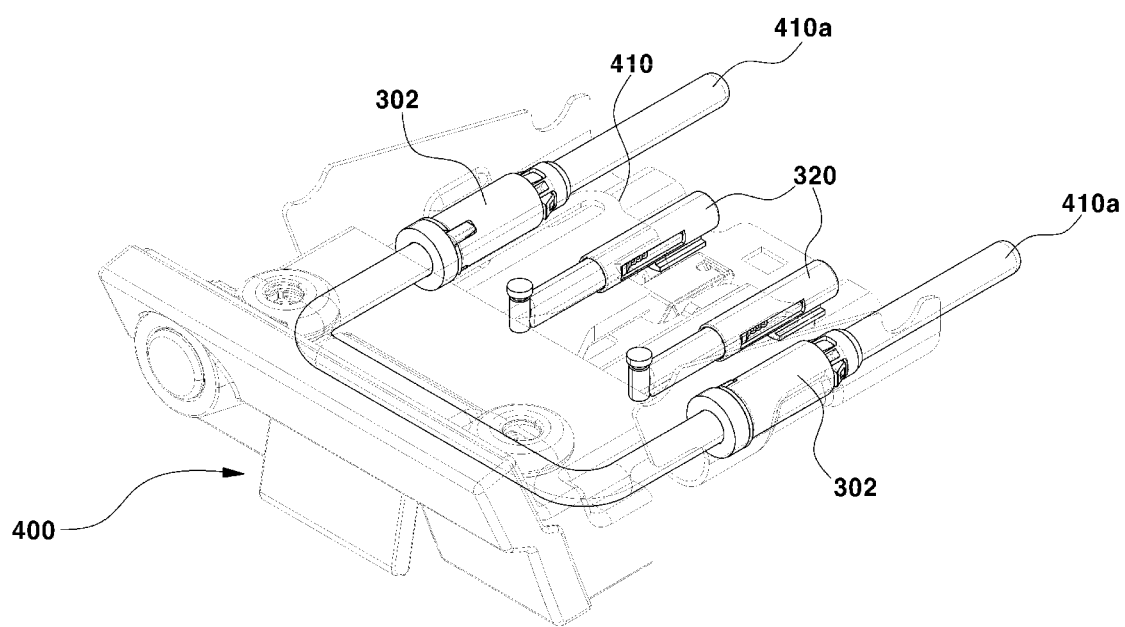
Figure 9:
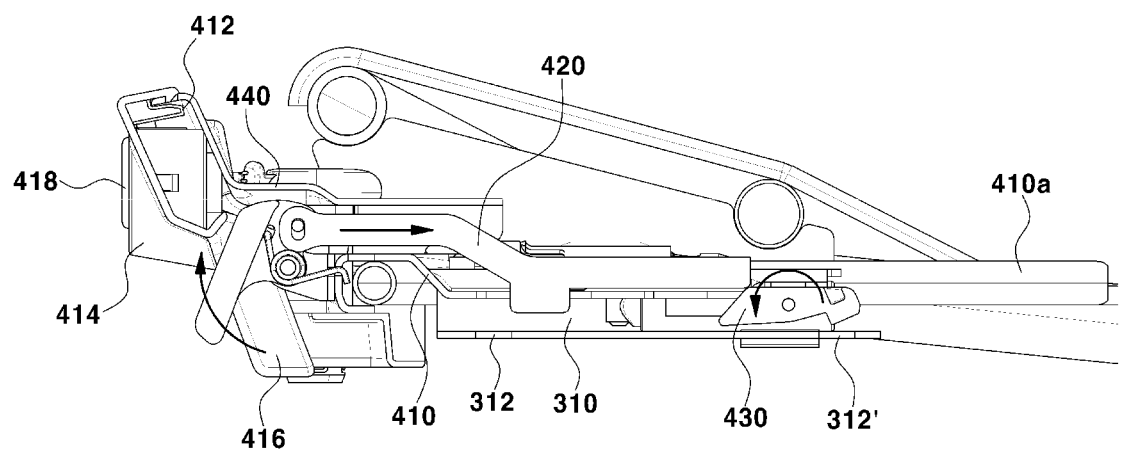
FIGS. 9 and 10 are views showing a drawn-out state of the pillow mounting unit of the foldable seat apparatus for the multi-purpose vehicle according to an embodiment of the present disclosure.
Figure 10:
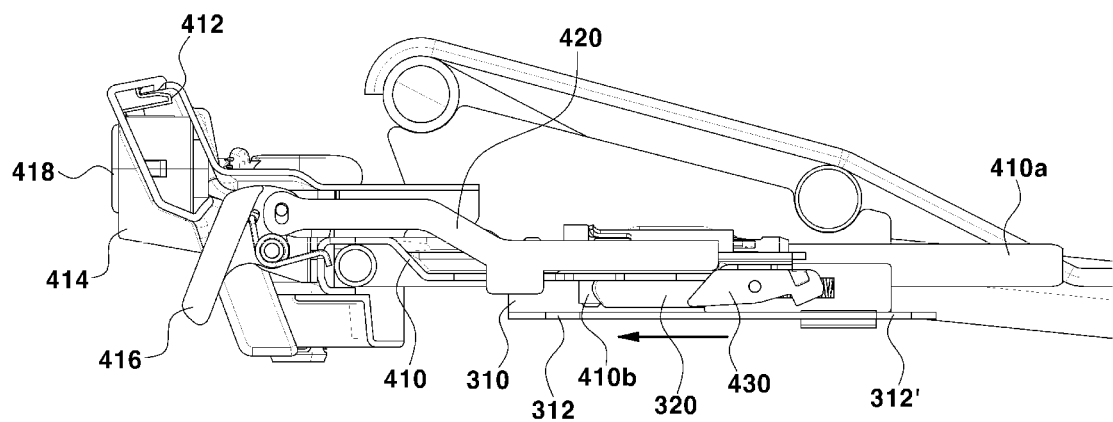
Figure 11:
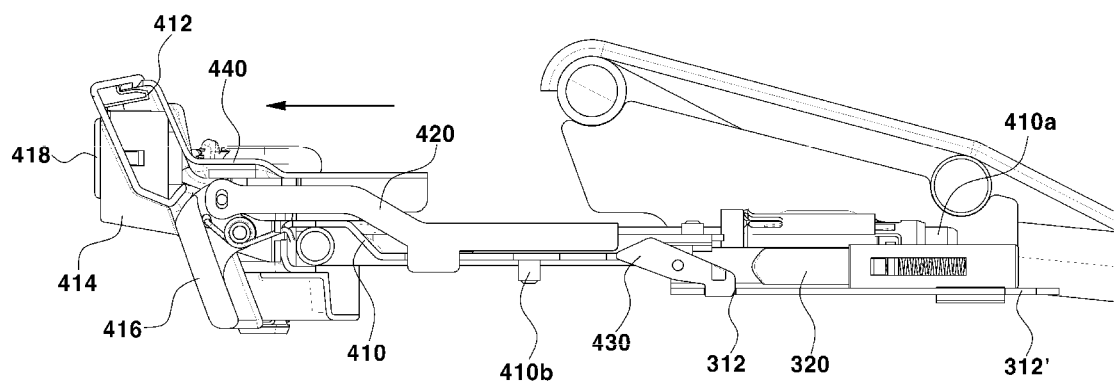
FIGS. 11 and 12 are views showing the pillow mode of the foldable seat apparatus for the multi-purpose vehicle according to an embodiment of the present disclosure.
Figure 12:
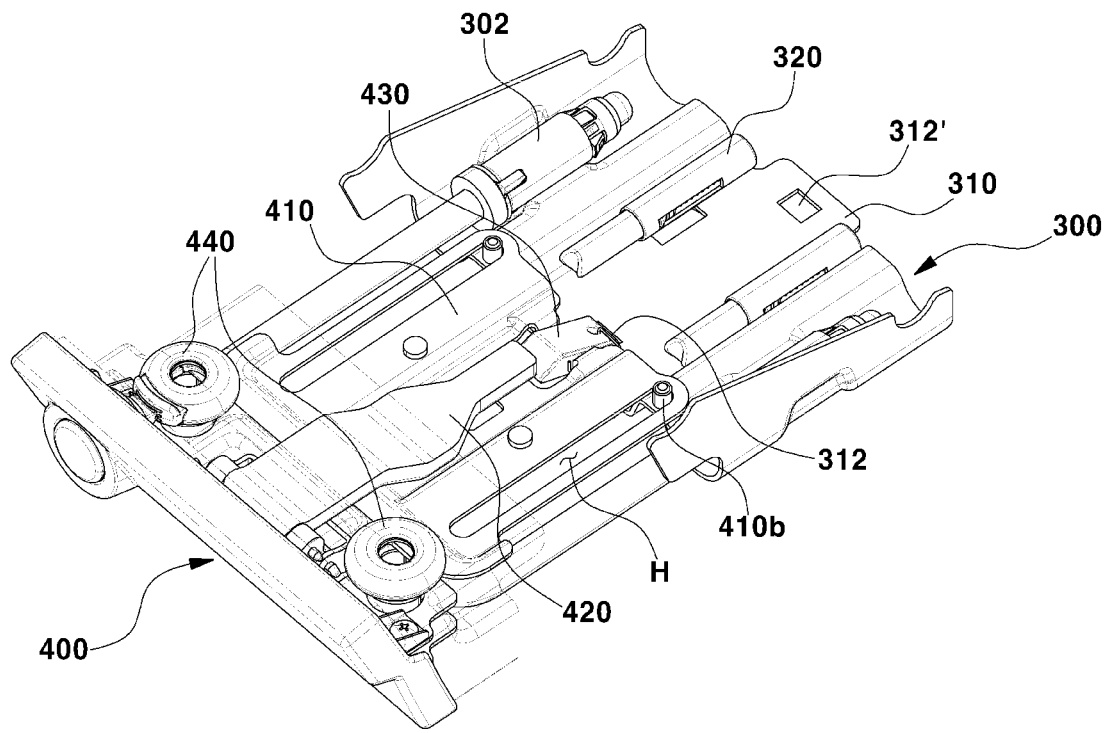

In addition, FIGS. 7 and 8 are views showing a stored state of the pillow mounting unit of the foldable seat apparatus for the multi-purpose vehicle according to an embodiment of the present disclosure, FIGS. 9 and 10 are views showing a drawn-out state of the pillow mounting unit of the foldable seat apparatus for the multi-purpose vehicle according to an embodiment of the present disclosure, and FIGS. 11 and 12 are views showing the pillow mode of the foldable seat apparatus for the multi-purpose vehicle according to an embodiment of the present disclosure.

Figure 13:
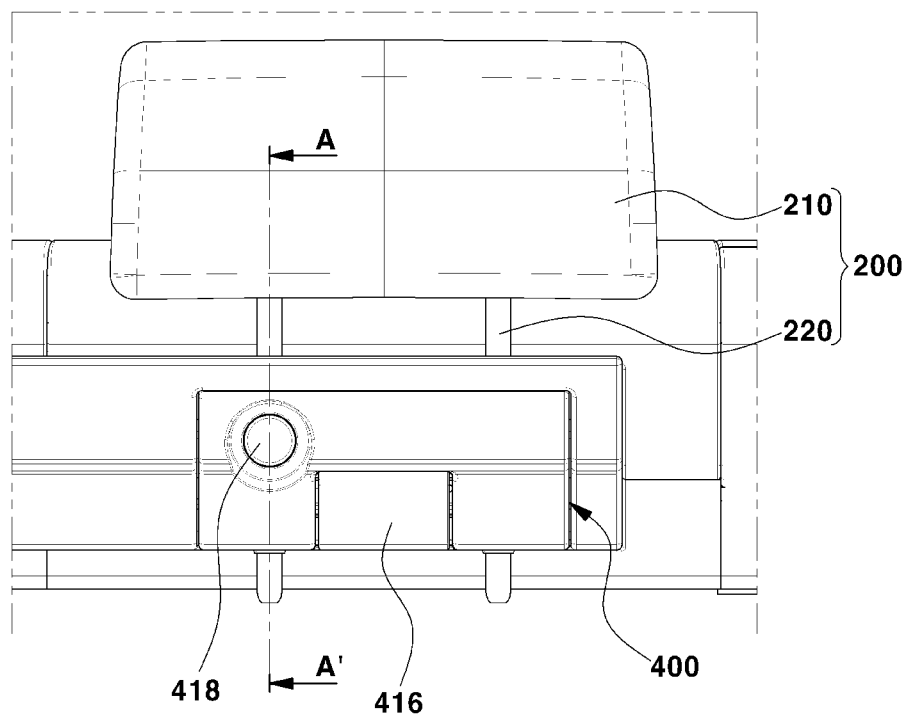
FIG. 13 is a view showing a push button of the foldable seat apparatus for the multi-purpose vehicle according to an embodiment of the present disclosure.
Figure 14:
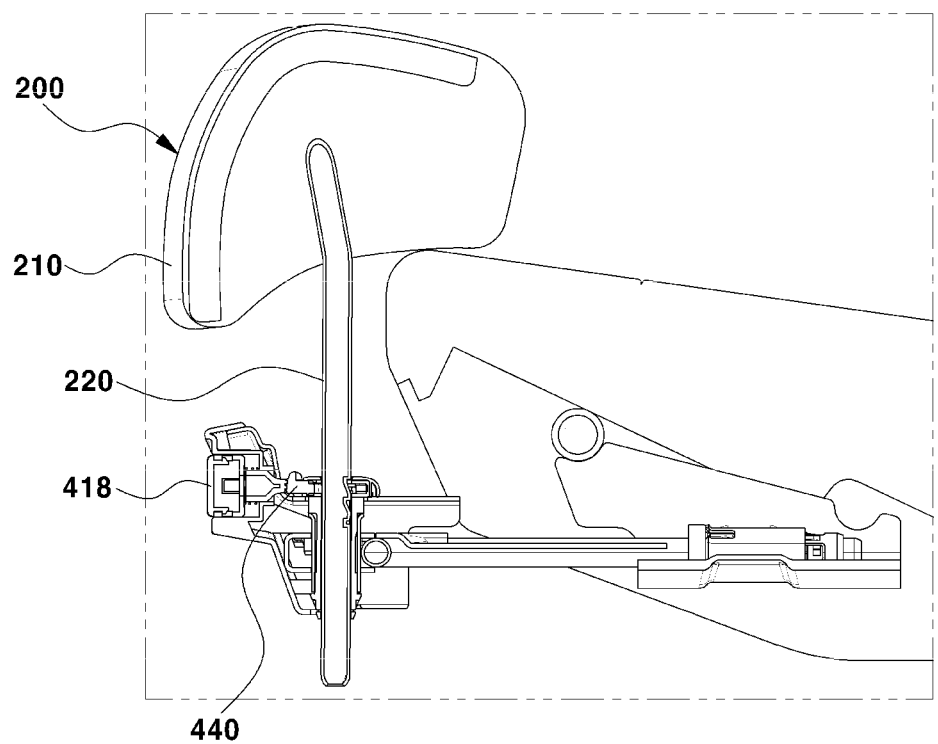
FIG. 14 is a view showing a height adjustment according to the pressurization of a push button of the foldable seat apparatus for the multi-purpose vehicle according to an embodiment of the present disclosure.
Figure 15:
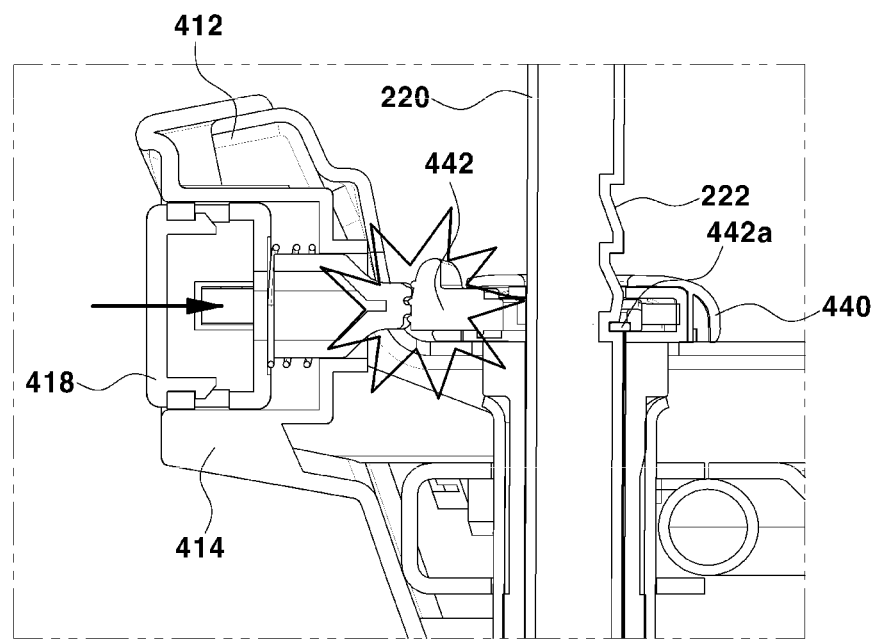
FIG. 15 is a cross-sectional view taken along line A-A' in FIG. 13 of the foldable seat apparatus for the multi-purpose vehicle according to an embodiment of the present disclosure.

In addition, FIG. 13 is a view showing a push button of the foldable seat apparatus for the multi-purpose vehicle according to an embodiment of the present disclosure, FIG. 14 is a view showing a height adjustment according to the pressurization of a push button of the foldable seat apparatus for the multi-purpose vehicle according to an embodiment of the present disclosure, and FIG. 15 is a cross-sectional view taken along line A-A' in FIG. 13 of the foldable seat apparatus for the multi-purpose vehicle according to an embodiment of the present disclosure.

As shown in FIG. 1A, a seat unit 100 may generally include a seat cushion 110 and a seatback 120 rotatably coupled to the seat cushion 110.

Recently, as the population using camping using a multi-purpose vehicle (MPV) and car camping (camping in which a user lodges inside a vehicle) increases, as shown in FIG. 1B, a seat lever 100a is operated to rotate the seatback 120, thereby making the seat unit 100 fully flat with respect to the seat cushion 110.

In this state, the headrest unit 200 coupled to the seat unit 100 may inevitably interfere with the facing seat units 100 in other rows and thus the headrest unit 200 is required to be removed, but after removal, not only there is a risk of loss, but also a separate storage space is required even when storage is made inside the vehicle in order to prevent loss, which causes inconvenience in which a space residing inside the vehicle upon camping or car camping using the multi-purpose vehicle is narrow.

To this end, as shown in FIGS. 1B and 1C, by removing the headrest unit 200 mounted on the seatback 120 to mount the headrest unit 200 on a pillow mounting unit 400 selectively drawn out from the seat cushion 110 and enabling the headrest unit 200 to be used as a pillow, it is possible to effectively remove the inconvenience.

The above-described pillow mounting unit 400 may be positioned to be latched to a mounting guide unit 300 fixedly coupled to the seat cushion 110 and stored inside the seat cushion 110, and latch-released from the mounting guide unit 300 in a horizontal state, that is, in a full flat state of the seat cushion 110 and the seatback 120, and thus formed to be drawn out to the outside of the seat cushion 110.

Before describing the pillow mounting unit 400, the mounting guide unit 300 to which the pillow mounting unit 400 is latched will be described as follows.

The mounting guide unit 300 may be fixedly coupled to the seat cushion 110, and include a coupling plate 310 and a compression spring 320.

As shown in FIG. 2, each edge of the coupling plate 310 may be coupled and fixed to a center pipe 112 and a main pipe 114 provided in the seat cushion 110 through welding or the like.

In addition, the coupling plate 310 may be provided with a pair of latching grooves 312 and 312' formed to be spaced apart from each other in a drawn-out direction of the pillow mounting unit 400.

In addition, the coupling plate 310 may be provided with a pair of mounting areas (not shown) having a groove shape, and a pair of connecting parts 302 for connecting the pillow mounting unit 400 may be fixedly disposed in the mounting area.

A pair of compression springs 320 coupled to the mounting groove 310a provided on the coupling plate 310 are provided, and may selectively provide an elastic force toward the drawn-out pillow mounting unit 400 (see FIG. 4).

Meanwhile, as the pillow mounting unit 400 is drawn out from the inside of the seat cushion 110, the pillow mounting unit 400 is provided so that the headrest unit 200 may be mounted, and thus may guide the headrest unit 200 to be switched to a pillow mode that is set for the foldable seat apparatus.

To this end, as shown in FIGS. 3 and 4, the pillow mounting unit 400 may include a main body portion 410, a slide lever portion 420, a locking portion 430, and a mounting portion 440.

The main body portion 410 may be coupled to a pair of coupling members 410*a* formed to protrude from the pair of connecting parts 302 provided in the mounting guide unit 300 to be movable in the forward and backward directions, and thus may be stored inside the seat cushion 110 or selectively drawn out to the outside of the seat cushion 110, and in addition, a drawn-out position of the main body portion 410 may be adjusted as much as desired when the main body portion 410 is drawn out to the outside of the seat cushion 110, so that the position of the headrest unit 200 may also be adjusted in the forward and backward directions according to the body shape of the occupant in the pillow mode.

The main body portion 410 may include a base member 412, a cover member 414, and an operation member 416.

The base member 412 may be a member selectively exposed to the outside of the seat cushion 110, and includes a pair of coupling areas A for coupling the mounting portion 440.

The cover member 414 may include a through hole 414*a* coupled to a front surface of the base member 412, and formed to face any one of the pair of coupling areas A.

The operation member 416 may be exposed to the outside in a state of being disposed to come into contact with one side of the slide lever portion 420, and rotate axially according to a pulling operation to pressurize the slide lever portion 420 so that the slide lever portion 420 is slidable accordingly, so that the locking portion 430 positioned to be selectively latched to the latching groove 312' of the coupling plate 310 may be latch-released.

In addition, the main body portion 410 may further include a push button 418, and the push button 418 is inserted into the through hole 414*a*, and upon pressing operation, latch-releases an adjustment groove 222 of the coupling portion 220 by pressurizing a release button 442 provided on the mounting portion 440, so that the headrest unit 200 may be formed to be adjustable in height and removable (see FIG. 6).

The slide lever portion 420 may be rail-coupled to the inside of the main body portion 410 to be formed to slide selectively in the drawn-out direction (forward and backward directions), whereas being formed to be bent to correspond to the shape of the main body portion 410.

In addition, the locking portion 430 may be positioned to be latched to the latching groove 312 provided in the mounting guide unit 300, and as the slide lever portion 420 slides and is pressurized, the slide lever portion 420 may be formed to rotate through a structure of the spring 432 and a rotary shaft 434 to be latch-released from the latching groove 312.

The mounting portion 440 may be provided to be exposed to the outside as the main body portion 410 moves and is drawn out from the seat cushion 110, and guide the headrest unit 200, specifically, a pair of coupling portions 220 provided in the headrest unit 200 to be coupled for a switch to the pillow mode.

For reference, as shown in FIG. 6, the headrest unit 200 may be composed of a head portion 210 and the coupling portion 220, in which the head portion 210 is composed of a first area 212 for supporting the occupant's head and a second area 214 positioned above the first area 212 in a state of being mounted on the seatback 120.

In addition, the coupling portion 220 may be provided to have a predetermined length under the head portion 210 facing the second area 214, and may be mounted on the seatback 120 or the pillow mounting unit 400 and formed so that the head portion 210 is fixed thereto.

Here, the head portion 210 may be formed so that the first area 212 supports the occupant's head when the head portion 210 is mounted on the seatback 120, and the second area 214 supports the occupant's head when the head portion 210 is mounted on the pillow mounting unit 400, that is, in the pillow mode as shown in FIG. 5.

Based on the configuration of the foldable seat apparatus for the multi-purpose vehicle according to this embodiment described above, an operation relationship thereof will be described below with reference to FIGS. 7 to 15.

In a normal state (see FIG. 1A), as shown in FIGS. 7 and 8, the locking portion 430 may be positioned to be latched to the latching groove 312', so that the entire pillow mounting unit 400 including the main body portion 410, the slide lever portion 420, the locking portion 430, and the mounting portion 440 is fixed to the inside of the seat cushion 110.

In addition, in a state in which the seatback 120 is rotated to make the seat unit 100 fully flat (see FIG. 1B), the pillow mounting unit 400 may need to be drawn out in a forward direction in order to switch the seat unit 100 to the pillow mode, and for this operation, the operation member 416 may need to be first pulled.

Here, as shown in FIG. 9, when the operation member 416 is pulled, the slide lever portion 420 may slide into the main body portion 410 by the rotating operation member 416, so that the slide lever portion 420 pressurizes the inclined one side of the locking portion 430.

As described above, the locking portion 430 may be latch-released from the latching groove 312' as the locking portion 430 is rotated by the slide lever portion 420, and at this time, the compression spring 320 may elastically pressurize a push pin 410*b* formed to protrude from the lower portion of the main body portion 410 so that a certain portion of the main body portion 410 is drawn out to the outside of the seat cushion 110 as shown in FIG. 10.

At this time, as shown in FIG. 11, when the user pulls the partially drawn-out main body portion 410 in the drawn-out direction, the drawn-out position may be pulled up to the pillow mode, specifically, as shown in FIG. 12, a position at which a stopper 330 provided to limit the drawn-out position is latched to one end of a slot hole H while the locking portion 430 is positioned to be latched to the latching groove 312 positioned at a front side, and thus fixed in a state of being drawn out to the outside.

As a result, the mounting portion 440 may be in a state of being exposed to the outside of the seat cushion 110, and in this state, the coupling portion 220 may be inserted into and fixed to the mounting portion 440, respectively, and the occupant's head is supported through the second area 214, so that the head portion 210 separated from the seatback 120 may function as the pillow upon full flat of the seat unit 100.

Here, to function as the pillow more effectively, the height of the headrest unit 200 may be adjusted for the occupant's convenience, and to this end, as shown in FIG. 13, the height may be adjusted by pressing the push button 418.

In other words, when the push button 418 is in the state of being inserted into the through hole 414*a*, as shown in FIG. 13, one end may be exposed to the outside, and the other end may be mounted inside the cover member 414, and at this time, since the push button 418 is disposed to face the release button 442, as the push button 418 is pressed, the height of the head portion 210 may be adjusted due to the separation of the adjustment groove 222 of the guide lock 442a by the release button 442 as shown in FIGS. 14 and 15.

Here, the height of the head portion 210 may be adjusted by an interval between the plurality of adjustment grooves 222, and in addition, when the adjustment of the height is completed, the guide lock 442a is positioned to be latched to the adjustment groove 222 at the height-adjusted position again by pressurizing the release button 442 through the push button 418, so that it is possible to fix the height-adjusted position.

In addition, to couple the seat unit 100 to the initial position, that is, the seatback 120 again for vehicle traveling, the coupling portion 220 may be separated from the mounting portion 440 and then coupled to the seatback 120 after the adjustment groove 222 and the guide lock 442a are latch-released in the same manner as above, and when the headrest unit 200 is separated as described above, the pillow mounting unit 400 is also drawn into the seat cushion 110 and thus switched to the normal state (see FIG. 1A), so that it is possible to prevent the occupant's inconvenience due to interference.

According to the present disclosure, it is possible to make the seat fully flat through folding upon camping or car camping (camping in which the user lodges inside the vehicle) using the multi-purpose vehicle (MPV), and prevent a risk of loss through mounting by removing the headrest that interferes with the facing seats in other rows.

In addition, according to the present disclosure, it is possible to improve convenience of residing in the vehicle by coupling the removed headrest to the pillow mounting unit selectively drawn out from the seat cushion to enable the headrest to be used as the pillow.

While the present disclosure has been described with reference to the embodiment(s) shown in the drawings, this is merely illustrative, and those skilled in the art will understand that various modifications therefrom are possible, and all or some of the above-described embodiment(s) may also be selectively combined and configured. Accordingly, the true technical scope of the present disclosure should be defined by the technical spirit of the appended claims.

What is claimed is:

1. A foldable seat apparatus for a multi-purpose vehicle comprising:
   a seat unit comprising of a seat cushion, and a seatback rotatably coupled to the seat cushion, and configured to rotate the seatback and formed to make a horizontal state with respect to the seat cushion by operating an operation lever;
   a headrest unit mounted on the seatback, and provided to be separable;
   a mounting guide unit coupled to the seat cushion; and
   a pillow mounting unit configured to be latched to the mounting guide unit to be stored in the seat cushion, drawn out to the outside of the seat cushion by selectively being latch-released from the mounting guide unit in the horizontal state, and equipped with the headrest unit to guide the headrest unit to be switched to a set pillow mode.

2. The foldable seat apparatus for the multi-purpose vehicle of claim 1, wherein in the horizontal state, the seat unit is fully flat with respect to the seat cushion.

3. The foldable seat apparatus for the multi-purpose vehicle of claim 1, wherein the pillow mode is a mode in which the headrest unit is mounted on the pillow mounting unit, and selectively mounted as the seat unit makes the horizontal state so that an occupant's head is supported by the seat cushion.

4. The foldable seat apparatus for the multi-purpose vehicle of claim 1, wherein the pillow mounting unit comprises:
   a main body portion movably coupled to a pair of connecting portions provided in the mounting guide unit stored inside the seat cushion;
   a slide lever portion rail-coupled to the main body portion, and formed to slide inside the main body portion;
   a locking portion positioned to be latched to a latching groove provided in the mounting guide unit, and formed to be selectively rotated as the slide lever portion slides and is pressurized and latch-released from the latching groove; and
   a mounting portion provided to be exposed to the outside as the main body portion moves to be drawn out from the seat cushion, and configured to guide the coupling of the headrest unit for a switch to the pillow mode.

5. The foldable seat apparatus for the multi-purpose vehicle of claim 4, wherein the main body portion is adjustable in position in forward and backward directions of the headrest unit by adjusting a drawn-out position when drawn out from the inside of the seat cushion.

6. The foldable seat apparatus for the multi-purpose vehicle of claim 4, wherein the main body portion comprises:
   a base member comprising a pair of coupling areas for coupling the mounting portion;
   a cover member comprising a through hole coupled to the base member, and formed to face any one of the pair of coupling areas; and
   an operation member exposed to the outside in a state of being disposed to come into contact with one side of the slide lever portion, and configured to rotate axially according to a pulling operation to selectively pressurize the slide lever portion, and latch-release the locking portion.

7. The foldable seat apparatus for the multi-purpose vehicle of claim 6, wherein the main body portion further comprises a push button that is inserted into the through hole, and pressurizes a release button provided on the mounting portion to be formed so that a height of the headrest unit is adjustable and removable.

8. The foldable seat apparatus for the multi-purpose vehicle of claim 7, wherein the push button faces the release button.

9. The foldable seat apparatus for the multi-purpose vehicle of claim 1, wherein the headrest unit comprises:
   a head portion composed of a first area supporting an occupant's head in a state of being mounted on the seatback and a second area positioned above the first area; and
   a coupling portion provided on a lower portion of the head portion facing the second area, and mounted on the seatback or the pillow mounting unit and formed so that the head portion is fixed thereto.

10. The foldable seat apparatus for the multi-purpose vehicle of claim 9, wherein the coupling portion comprises an adjustment groove.

11. The foldable seat apparatus for the multi-purpose vehicle of claim 10, wherein the coupling portion comprises a plurality of adjustment grooves, and a height of the head portion is adjusted by an interval between the adjustment grooves.

12. The foldable seat apparatus for the multi-purpose vehicle of claim 10, wherein the pillow mounting unit further comprises a guide lock that latch-releases the adjustment groove.

13. The foldable seat apparatus for the multi-purpose vehicle of claim 12,
wherein the head portion is formed so that the first area supports the occupant's head when the head portion is mounted on the seatback, and the second area supports the occupant's head in the pillow mode when the head portion is mounted on the pillow mounting unit.

14. The foldable seat apparatus for the multi-purpose vehicle of claim 1,
wherein the mounting guide unit comprises:
a coupling plate comprising a pair of latching grooves having edges coupled and fixed to a center pipe and a main pipe configuring the seat cushion, and formed to be spaced apart from each other in a drawn-out direction of the pillow mounting unit; and
a plurality of compression springs coupled to the coupling plate, and configured to selectively provide an elastic force toward the pillow mounting unit that is drawn out.

15. The foldable seat apparatus for the multi-purpose vehicle of claim 14, wherein the compression springs are coupled to a mounting groove provided on the coupling plate.

16. The foldable seat apparatus for the multi-purpose vehicle of claim 14, wherein the compression springs are configured to elastically pressurize a push fin protruding from the main body portion.

17. The foldable seat apparatus for the multi-purpose vehicle of claim 14,
wherein the mounting guide unit further comprises a stopper provided on the coupling plate, and formed to limit a drawn-out position of the pillow mounting unit in the drawn-out direction, and
the stopper is positioned inside each of a pair of slot holes provided in the pillow mounting unit.

18. The foldable seat apparatus for the multi-purpose vehicle of claim 17,
wherein the pillow mode is set so that the pillow mounting unit is positioned to be latched to the latching groove positioned at a front side among the pair of latching grooves and the stopper is positioned to be latched to one end of the slot hole.

19. A vehicle comprising the foldable seat apparatus for the multi-purpose vehicle of claim 1.

* * * * *